United States Patent
Jinno et al.

(10) Patent No.: US 8,714,325 B2
(45) Date of Patent: May 6, 2014

(54) HYDRAULIC PRESSURE CONTROL DEVICE

(75) Inventors: Tomoya Jinno, Nishio (JP); Tetsuya Shimizu, Anjo (JP); Kazunori Ishikawa, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 257 days.

(21) Appl. No.: 13/434,331

(22) Filed: Mar. 29, 2012

(65) Prior Publication Data

US 2012/0247899 A1 Oct. 4, 2012

(30) Foreign Application Priority Data

Mar. 30, 2011 (JP) ................................. 2011-074989

(51) Int. Cl.
*F16H 61/14* (2006.01)

(52) U.S. Cl.
USPC ...................................... 192/3.29; 192/85.63

(58) Field of Classification Search
None
See application file for complete search history.

(56) References Cited

U.S. PATENT DOCUMENTS

2010/0181159 A1* 7/2010 Shimizu et al. ............ 192/85.63

FOREIGN PATENT DOCUMENTS

| JP | A-5-133467 | 5/1993 |
|---|---|---|
| JP | A-7-91531 | 4/1995 |
| JP | A-7-310814 | 11/1995 |
| JP | A-8-4891 | 1/1996 |
| JP | A-2003-042287 | 2/2003 |
| JP | A-2007-263208 | 10/2007 |
| JP | A-2010-242964 | 10/2010 |

OTHER PUBLICATIONS

Apr. 17, 2012 International Search Report issued in International Patent Application No. PCT/JP2012/056242 (with translation).

* cited by examiner

*Primary Examiner* — Rodney Bonck
(74) *Attorney, Agent, or Firm* — Oliff PLC

(57) ABSTRACT

A hydraulic pressure controller, which controls hydraulic pressure supplied to a torque converter including a lock-up clutch that is engageable using a hydraulic pressure from a mechanical pump, including a first pressure regulation valve that regulates pressure in a first passage connected to the pump while discharging oil in the first passage to a discharge passage; a bypass passage branched from the first passage bypassing the first pressure regulation valve; a first switching valve selectively switchable between a first state in which the bypass passage and a second passage are connected to each other and a second state in which the discharge passage and the second passage are connected to each other; and a second pressure regulation valve that regulates a hydraulic pressure in the second passage. The first switching valve is switchable into the first state to engage the clutch and into the second state to disengage the clutch.

5 Claims, 2 Drawing Sheets

HYDRAULIC PRESSURE CONTROL DEVICE

INCORPORATION BY REFERENCE

The disclosure of Japanese Patent Application No. 2011-074989 filed on Mar. 30, 2011 including the specification, drawings and abstract is incorporated herein by reference in its entirety.

BACKGROUND OF THE INVENTION

The present invention relates to a hydraulic pressure control device, and more particularly to a hydraulic pressure control device that controls supply of a hydraulic pressure to a torque converter including a lock-up clutch that is engageable using a hydraulic pressure from a mechanical pump driven by power from a motor.

Description of the Related Art

Hitherto, there has been proposed a hydraulic pressure control device including a primary regulator valve that regulates a hydraulic pressure from a hydraulic pump driven by power from an engine to a line pressure along with discharge of an excessive pressure, a secondary regulator valve that regulates the excessive pressure discharged from the primary regulator valve to a secondary pressure, and a relay valve that switches between oil passages between the secondary regulator valve and a torque converter so that a hydraulic pressure is supplied to a lock-up clutch of the torque converter (see Japanese Patent Application Publication No. 2003-42287, for example). In the device, the relay valve switches between paths through which the secondary pressure is supplied to the torque converter to engage and disengage the lock-up clutch using the secondary pressure.

In the device described in Japanese Patent Application Publication No. 2003-42287, however, the secondary pressure may not be increased to be high enough to engage the lock-up clutch in the case where the rotational speed of the engine is low and the ejection pressure of the hydraulic pump is low. Therefore, there is also proposed a device including not only a primary regulator valve and a secondary regulator valve but also a modulator valve that regulates a line pressure to a modulator pressure and a switching valve that switches between an oil passage through which the modulator pressure is supplied to a torque converter and an oil passage through which a secondary pressure is supplied to the torque converter (see Japanese Patent Application Publication No. 2007-263208, for example). In the device, the switching valve is switched such that the modulator pressure is supplied to the torque converter to engage the lock-up clutch, and the switching valve is switched such that the secondary pressure is supplied to the torque converter to disengage the lock-up clutch. This allows the lock-up clutch to be engaged using the modulator pressure obtained by regulating the line pressure even in the case where the secondary pressure is not increased to be sufficiently high.

SUMMARY OF THE INVENTION

In the device discussed above, the lock-up clutch can be engaged even when the rotational speed of the engine is low and the ejection pressure of the hydraulic pump is low. However, it is considered that the modulator pressure may be temporarily reduced under the influence of variations in hydraulic pressure that occur during engagement of the lock-up clutch. When the lock-up clutch is switched from a disengaged state to an engaged state, in particular, oil flowing to the torque converter is temporarily increased to conspicuously reduce the modulator pressure. Here, the modulator pressure is also used as the signal pressure for solenoid valves etc. that control friction engagement elements such as clutches. Therefore, a reduction in modulator pressure may make control of such valves unstable. Meanwhile, it is also conceivable to directly supply the line pressure to the torque converter. When the rotational speed of the engine becomes high, however, the supplied line pressure may be too high depending on the design of the torque converter.

A main object of the hydraulic pressure control device according to the present invention is to more appropriately engage a lock-up clutch even from a state in which the rotational speed of a motor is low and the ejection pressure of a pump is low.

In order to achieve the foregoing main object, the hydraulic pressure control device according to the present invention adopts the following means.

A hydraulic pressure control device according to an aspect of the invention controls supply of a hydraulic pressure to a torque converter including a lock-up clutch that is engageable using a hydraulic pressure from a mechanical pump driven by power from a motor. The hydraulic pressure control device includes: a first pressure regulation valve that regulates a hydraulic pressure in a first oil passage connected to the mechanical pump while discharging oil in the first oil passage to a discharge oil passage; a bypass oil passage branched from the first oil passage to bypass the first pressure regulation valve; a first switching valve that is selectively switchable between a first state in which the bypass oil passage and a second oil passage are connected to each other and a second state in which the discharge oil passage and the second oil passage are connected to each other; and a second pressure regulation valve that regulates a hydraulic pressure in the second oil passage, in which the first switching valve is configured to be switched into the first state to engage the lock-up clutch, and to be switched into the second state to disengage the lock-up clutch.

The hydraulic pressure control device according to the aspect of the present invention includes the first pressure regulation valve that regulates the hydraulic pressure in the first oil passage connected to the mechanical pump while discharging the oil in the first oil passage to the discharge oil passage, the bypass oil passage branched from the first oil passage to bypass the first pressure regulation valve, the first switching valve that is selectively switchable between the first state in which the bypass oil passage and the second oil passage are connected to each other and the second state in which the discharge oil passage and the second oil passage are connected to each other, and the second pressure regulation valve that regulates the hydraulic pressure in the second oil passage, and the first switching valve is configured to be switched into the first state to engage the lock-up clutch, and to be switched into the second state to disengage the lock-up clutch. This allows the lock-up clutch to be engaged by supplying a hydraulic pressure to the second oil passage even from a state in which the rotational speed of the motor is low and the ejection pressure of the pump is low. In addition, the bypass oil passage which supplies a hydraulic pressure to the second oil passage when the lock-up clutch is to be engaged is branched from the first oil passage which carries a relatively large amount of oil. Thus, it is possible to suppress the influence of variations in hydraulic pressure along with engagement of the lock-up clutch on other control. As a result, the hydraulic pressure in the first oil passage connected to the mechanical pump is not directly supplied to the torque converter, and the lock-up clutch can be engaged more appropriately even from a state in which the rotational speed of the motor is low and the ejection pressure of the mechanical pump is low. In a hydraulic pressure control device mounted on an automatic transmission that transfers power of a motor input via a torque converter with the speed ratio changed by switching the engagement states of friction engagement elements, for example, the hydraulic pressure in the first oil passage may be a line pressure for use for engagement of the friction engagement elements.

In addition, the hydraulic pressure control device according to the aspect of the present invention controls the hydraulic pressure to the torque converter which engages the lock-up clutch using an engagement pressure corresponding to a difference in oil pressure between an engagement oil chamber and a disengagement oil chamber. The hydraulic pressure control device may further include a second switching valve that is selectively switchable between a first state in which the hydraulic pressure in the second oil passage is input to both the engagement oil chamber and the disengagement oil chamber and a second state in which the hydraulic pressure in the second oil passage is input to the disengagement oil chamber to be output from the engagement oil chamber, and the first switching valve and the second switching valve may be configured to be switchable using a common spool such that the first state of the first switching valve and the first state of the second switching valve correspond to each other and the second state of the first switching valve and the second state of the second switching valve correspond to each other. This allows the first switching valve and the second switching valve to be switched at the same timing so that the hydraulic pressure can be supplied smoothly. In addition, the space requirements for arrangement of the first switching valve and the second switching valve can be reduced.

In the hydraulic pressure control device according to the aspect of the present invention, further, the first switching valve may be connected to the bypass oil passage via an orifice. This makes it possible to suppress the influence of variations in hydraulic pressure along with engagement of the lock-up clutch on the bypass oil passage, and thus to more reliably suppress the influence of such variations in hydraulic pressure on other control.

In the hydraulic pressure control device according to the aspect of the present invention, moreover, the first switching valve may further be connected to a cooler oil passage coupled to a cooler that cools oil, and may connect the discharge oil passage and the cooler oil passage in the first state. This allows the oil to be immediately supplied to the cooler compared to a case where the oil discharged along with pressure regulation performed by the second pressure regulation valve is supplied to the cooler.

Also, the hydraulic pressure control device according to the aspect of the present invention may further include a control valve that can discharge at least part of the oil input to the disengagement oil chamber.

DETAILED DESCRIPTION OF THE EMBODIMENT

Now, an embodiment of the present invention will be described below.

Figure 1:
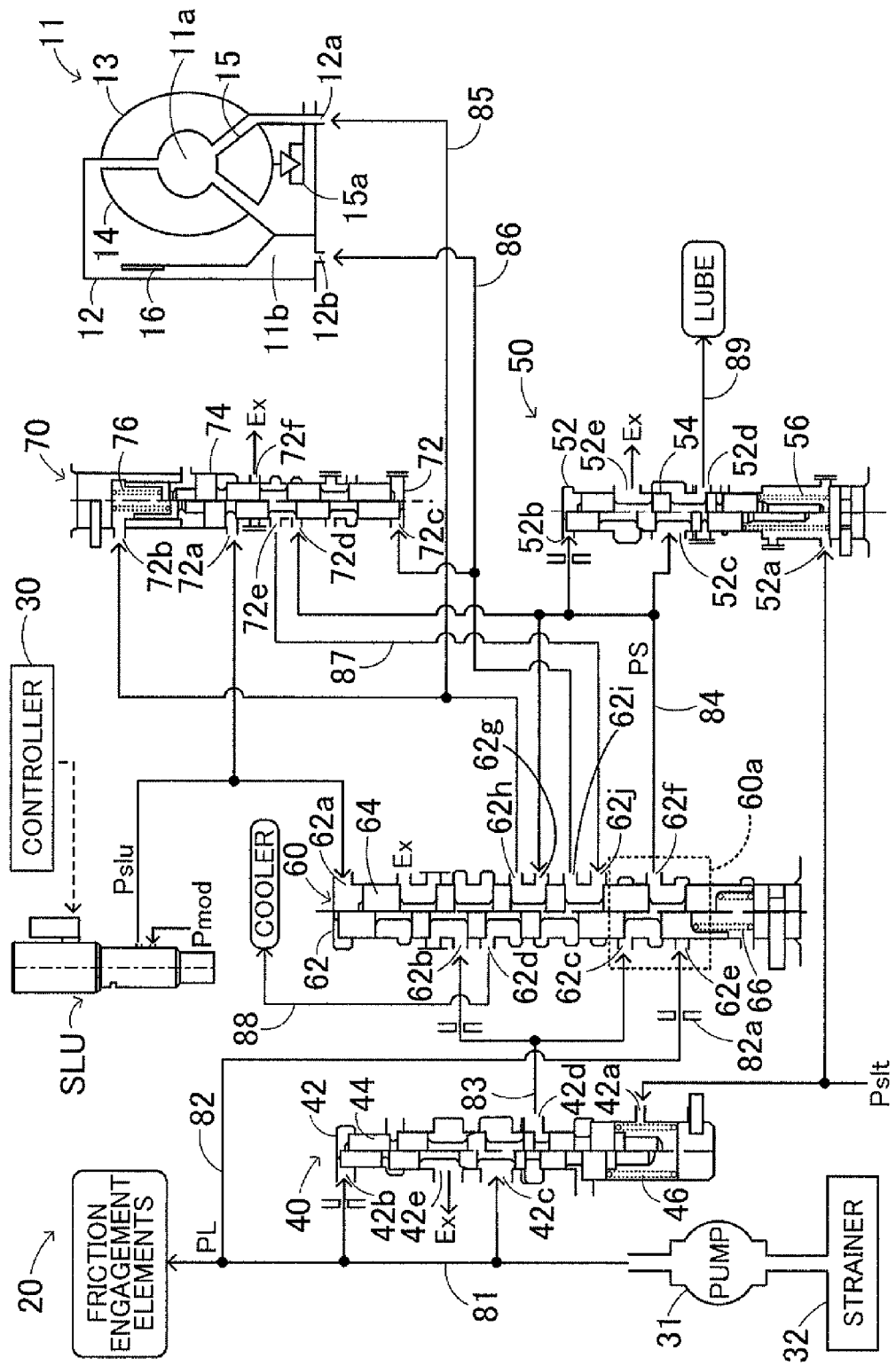
FIG. 1 is a diagram showing a schematic configuration of a hydraulic pressure control device 20.

FIG. 1 is a diagram showing a schematic configuration of a hydraulic pressure control device 20 according to an embodiment of the present invention. The hydraulic pressure control device 20 according to the embodiment is formed as a device that is provided in an automobile incorporating an engine and an automatic transmission (all not shown) and that controls a hydraulic pressure to be supplied to a torque converter 11 that receives engine torque output to a crankshaft of the engine to transfer the input torque to an input shaft of the automatic transmission.

The torque converter 11 includes a pump impeller 13 connected to the crankshaft via a converter cover 12, a turbine runner 14 connected to the input shaft and disposed opposite the pump impeller 13, a stator 15 which is disposed between the pump impeller 13 and the turbine runner 14 and to which a one-way clutch 15a that allows rotation only in one direction is attached, and a lock-up clutch 16 that directly couples the pump impeller 13 (converter cover 12) and the turbine runner 14 to each other. Transfer of torque through the torque converter 11 is performed by the pump impeller 13 converting the engine torque into a flow of oil and by the turbine runner 14 converting the flow of the oil into torque on the input shaft of the automatic transmission. An oil chamber in the torque converter 11 is partitioned by the lock-up clutch 16 into an engagement oil chamber 11a and a disengagement oil chamber 11b. An engagement oil chamber port 12a through which the oil is input to and output from the engagement oil chamber 11a and a disengagement oil chamber port 12b through which the oil is input to and output from the disengagement oil chamber 11b are formed. In the torque converter 11, the lock-up clutch 16 is engaged by an engagement pressure corresponding to a pressure difference between the hydraulic pressure in the engagement oil chamber 11a and the hydraulic pressure in the disengagement oil chamber 11b. Engagement includes a state in which the lock-up clutch 16 is completely engaged and a state in which the lock-up clutch 16 is half engaged (under so-called slip control). When the lock-up clutch 16 is completely engaged, the pump impeller 13 on the input side and the turbine runner 14 on the output side are directly coupled to each other so that the engine torque is mechanically and directly transferred to the input shaft of the automatic transmission.

As shown in FIG. 1, the hydraulic pressure control device 20 includes a mechanical oil pump 31 driven by power from the engine to pump the oil to a line pressure oil passage 81 via a strainer 32, a primary regulator valve 40 that is driven by a signal pressure Pslt from a linear solenoid SLT (not shown) and that regulates the pressure of the oil pumped to the line pressure oil passage 81 and generates a line pressure PL to output the oil to a discharge pressure oil passage 83 in accordance with the generated line pressure PL, a secondary regulator valve 50 that is driven by the signal pressure Pslt from the linear solenoid SLT (not shown) and that regulates the pressure of the oil in a secondary pressure oil passage 84 to generate a secondary pressure PS, a lock-up relay valve 60 that switches between paths through which the oil is supplied to the torque converter 11, a lock-up control valve 70 that mainly controls the hydraulic pressure in the disengagement oil chamber 11b, a linear solenoid SLU that receives a modulator pressure Pmod from a modulator valve (not shown) and that regulates the modulator pressure Pmod to output a signal pressure for driving the lock-up relay valve 60 and the lock-up control valve 70, and a controller 30 that controls drive of the linear solenoid SLU. Although not shown, the controller 30 is formed as a microprocessor including a CPU as its main component, and includes a ROM that stores a processing program, a RAM that temporarily stores data, and so forth in addition to the CPU. The line pressure PL is also used to control the engagement pressures for friction engagement elements such as clutches and brakes provided in the automatic transmission, for example.

The primary regulator valve 40 includes a sleeve 42 formed with various ports, a spool 44 that slides in the sleeve 42 in the axial direction, and a spring 46 that urges the spool 44 in the axial direction. The various ports formed in the sleeve 42 include: a signal pressure input port 42a that receives as a signal pressure an output pressure Pslt from the linear solenoid SLT (not shown); a feedback pressure input port 42b connected to the line pressure oil passage 81 to receive the line pressure PL as a feedback pressure; an input port 42c connected to the line pressure oil passage 81 to receive the line pressure PL; an output port 42d connected to the discharge pressure oil passage 83 to output a discharge pressure; and a drain port 42e. The spool 44 is urged upward in the drawing by the spring force of the spring 46 and the signal pressure input to the signal pressure input port 42a, and urged downward in the drawing by the feedback pressure input to the feedback pressure input port 42b. As the spool 44 is increasingly moved downward in the drawing, the amount of oil from the input port 42c output to the discharge pressure oil passage 83 via the output port 42d is increased, and the oil from the input port 42c is drained via the drain port 42e. In the primary regulator valve 40, in the case where the line pressure PL is low, the feedback pressure input to the feedback pressure input port 42b is also low, which reduces the force that urges the spool 44 downward in the drawing. Thus, little oil is discharged to the discharge pressure oil passage 83. As the line pressure PL becomes higher to exceed a predetermined upper limit pressure PLmax, meanwhile, the feedback pressure input to the feedback pressure input port 42b accordingly becomes higher, which increases the force that urges the spool 44 downward in the drawing. Thus, the oil at an excessive pressure exceeding the upper limit pressure PLmax is output to the discharge pressure oil passage 83 as a discharge pressure, or drained from the drain port 42e, so that the line pressure PL is kept generally constant at the upper limit pressure PLmax.

The secondary regulator valve 50 includes a sleeve 52 formed with various ports, a spool 54 that slides in the sleeve 52 in the axial direction, and a spring 56 that urges the spool 54 in the axial direction. The various ports formed in the sleeve 52 include: a signal pressure input port 52a that receives as a signal pressure the output pressure Pslt from the linear solenoid SLT (not shown); a feedback pressure input port 52b connected to the secondary pressure oil passage 84 to receive the secondary pressure PS as a feedback pressure; an input port 52c connected to the secondary pressure oil passage 84 to receive the secondary pressure PS; an output port 52d connected to a lubrication oil passage 89 coupled to an object to be lubricated (LUBE); and a drain port 52e. The spool 54 is urged upward in the drawing by the spring force of the spring 56 and the signal pressure input to the signal pressure input port 52a, and urged downward in the drawing by the feedback pressure input to the feedback pressure input port 52b. As the spool 54 is increasingly moved downward in the drawing, the amount of oil from the input port 52c output to the lubrication oil passage 89 via the output port 52d is increased, and the oil from the input port 52c is drained via the drain port 52e. In the secondary regulator valve 50, in the case where the secondary pressure PS is low, the feedback pressure input to the feedback pressure input port 52b is also low, which reduces the force that urges the spool 54 downward in the drawing. Thus, little oil is discharged to the lubrication oil passage 89. As the secondary pressure PS becomes higher to exceed a predetermined upper limit pressure PSmax, meanwhile, the feedback pressure input to the feedback pressure input port 52b accordingly becomes higher, which increases the force that urges the spool 54 downward in the drawing. Thus, the oil at an excessive pressure exceeding the upper limit pressure PSmax is output to the lubrication oil passage 89 as a discharge pressure, or drained from the drain port 52e, so that the secondary pressure PS is kept generally constant at the upper limit pressure PSmax.

The lock-up relay valve 60 is a switching valve (on/off valve) driven by an output pressure Pslu from the linear solenoid SLU, and includes a sleeve 62 formed with various ports, a spool 64 that slides in the sleeve 62 in the axial direction, and a spring 66 that urges the spool 64 in the axial direction. The various ports formed in the sleeve 62 include: a signal pressure input port 62a that receives as a signal pressure the output pressure Pslu from the linear solenoid SLU; input ports 62b and 62c that receive the discharge pressure output to the discharge pressure oil passage 83; an output port 62d connected to a cooler oil passage 88 coupled to a cooler (COOLER); an input port 62e connected via an orifice 82a to a bypass oil passage 82, which is branched from the line pressure oil passage 81 to bypass the primary regulator valve 40, to receive the line pressure PL; an output port 62f connected to the secondary pressure oil passage 84; an input port 62g connected to the secondary pressure oil passage 84; an output port 62h connected to an engagement oil chamber oil passage 85 coupled to the engagement oil chamber port 12a of the engagement oil chamber 11a; an output port 62i connected to a disengagement oil chamber oil passage 86 coupled to the disengagement oil chamber port 12b of the disengagement oil chamber 11b; and an input port 62j connected to a communication oil passage 87 coupled to the lock-up control valve 70. The spool 64 is urged upward in the drawing by the spring force of the spring 66, and urged downward in the drawing by the signal, pressure input to the signal pressure input port 62a.

In the lock-up relay valve 60, when no signal pressure is input from the linear solenoid SLU to the signal pressure input port 62a, the spool 64 is moved by the urging force of the spring 66 into the state indicated in the left half in the drawing. Therefore, communication between the input port 62c and the output port 62f is allowed, communication between the input port 62g and the output port 62i is allowed, and communication between the output port 62h and the output port 62d is allowed. This allows communication between the discharge pressure oil passage 83 and the secondary pressure oil passage 84, communication between the secondary pressure oil passage 84 and the disengagement oil chamber oil passage 86, and communication between the engagement oil chamber oil passage 85 and the cooler oil passage 88. When the signal pressure is input from the linear solenoid SLU to the signal pressure input port 62a, meanwhile, the spool 64 is moved downward in the drawing against the urging force of the spring 66 into the state indicated in the right half in the drawing. Therefore, communication between the input port 62b and the output port 62d is allowed, communication between the input port 62e and the output port 62f is allowed, communication between the input port 62g and the output port 62h is allowed, and communication between the input port 62j and the output port 62i is allowed. This allows communication between the bypass oil passage 82 and the secondary pressure oil passage 84, communication between the secondary pressure oil passage 84 and the engagement oil chamber oil passage 85, communication between the communication oil passage 87 and the disengagement oil chamber oil passage 86, and communication between the discharge pressure oil passage 83 and the cooler oil passage 88. In the following description, a portion that switches connection between the bypass oil passage 82 and the secondary pressure oil passage 84 and connection between the discharge pressure oil passage 83 and the secondary pressure oil passage 84, that is, a portion of the sleeve 62 in which the input ports 62c and 62e and the output port 62f are formed and a portion of the spool 64 that opens and closes such ports, is occasionally referred to as a switching portion 60a (indicated by the dotted line in the drawing).

The lock-up control valve 70 is a pressure regulation valve driven by the output pressure Pslu from the linear solenoid SLU, and includes a sleeve 72 formed with various ports, a spool 74 disposed so as to freely slidable in the sleeve 72 in the axial direction, and a spring 76 that urges the spool 74 in the axial direction. The various ports formed in the sleeve 72 include: a signal pressure input port 72a that receives as a signal pressure the output pressure Pslu from the linear solenoid SLU; a feedback pressure input port 72b connected to the engagement oil chamber oil passage 85 to receive a hydraulic pressure in the engagement oil chamber oil passage 85 as a feedback pressure; a feedback pressure input port 72c connected to the disengagement oil chamber oil passage 86 to receive a hydraulic pressure in the disengagement oil chamber oil passage 86 as a feedback pressure; an input port 72d connected to the secondary pressure oil passage 84; an output port 72e connected to the communication oil passage 87; and a drain port 72f. The signal pressure input port 72a is formed at a position between two lands formed on the spool 74 with different outside diameters. Therefore, the signal pressure input to the signal pressure input port 72a acts as a force that urges the spool 74 upward in the drawing because of the difference in area (difference in outside diameter) between respective pressure reception surfaces of the two lands, namely a land with a larger diameter on the upper side in the drawing and a land with a smaller diameter on the lower side in the drawing.

In the lock-up control valve 70, the spool 74 is urged downward in the drawing by the spring force of the spring 76 and the feedback pressure input to the feedback pressure input port 72b, and urged upward in the drawing by the signal pressure input to the signal pressure input port 72a and the feedback pressure input to the feedback pressure input port 72c. Therefore, the spool 74 is moved to a position at which such forces and pressures are balanced against each other. FIG. 1 shows the spool 74 positioned at both ends of its movement range. When the output pressure Pslu is not output from the linear solenoid SLU, the spool 74 is moved to the lower-end position indicated in the left half in the drawing. When the maximum output pressure Pslu is output from the linear solenoid SLU, the spool 74 is moved to the upper-end position indicated in the right half in the drawing. When the output pressure Pslu is not output from the linear solenoid SLU so that the spool 74 is moved to the lower-end position, communication between the input port 72d and the output port 72e is allowed to allow communication between the secondary pressure oil passage 84 and the communication oil passage 87. Then, when the output pressure Pslu from the linear solenoid SLU becomes gradually higher to increase the signal pressure input to the signal pressure input port 72a, the spool 74 is gradually moved upward in the drawing to gradually reduce the area of opening of the input port 72d along with the movement of the spool 74. Therefore, the hydraulic pressure output from the output port 72e to the communication oil passage 87 becomes lower as the signal pressure input to the signal pressure input port 72a becomes higher. Then, when the maximum output pressure Pslu is output from the linear solenoid SLU to move the spool 74 to the upper-end position indicated in the right half in the drawing, communication between the input port 72d and the output port 72e is blocked, and communication between the output port 72e and the drain port 72f is allowed. This allows the oil in the communication oil passage 87 to be drained.

Next, an operation of the thus configured hydraulic pressure control device 20 to supply a hydraulic pressure to the torque converter 11 will be described. First, an operation to establish a disengaged state in which the lock-up clutch 16 is disengaged will be described. This state can be established by turning off the linear solenoid SLU. When the linear solenoid SLU is turned off, the lock-up relay valve 60 and the lock-up control valve 70 are each brought into the state indicated in the left half in FIG. 1. Therefore, communication between the discharge pressure oil passage 83 and the secondary pressure oil passage 84 is allowed, communication between the secondary pressure oil passage 84 and the disengagement oil chamber oil passage 86 is allowed, communication between the secondary pressure oil passage 84 and the communication oil passage 87 is allowed, and communication between the engagement oil chamber oil passage 85 and the cooler oil passage 88 is allowed. This allows the discharge pressure output from the primary regulator valve 40 to the discharge pressure oil passage 83 to be input to the disengagement oil chamber 11b of the torque converter 11 sequentially via the secondary pressure oil passage 84 and the disengagement oil chamber oil passage 86, and then to be output from the engagement oil chamber 11a to the engagement oil chamber oil passage 85. An oil passage that disengages the lock-up clutch 16 is thus formed. The secondary regulator valve 50 regulates the hydraulic pressure in the secondary pressure oil passage 84 to the secondary pressure PS. Thus, the discharge pressure output to the discharge pressure oil passage 83 is restricted to the upper limit pressure PSmax of the secondary pressure PS before being supplied to the torque converter 11. The oil output to the engagement oil chamber oil passage 85 is supplied to the cooler via the cooler oil passage 88. The oil output from the secondary pressure oil passage 84 to the communication oil passage 87 fills the communication oil passage 87.

Subsequently, an operation to bring the lock-up clutch 16 into an engaged state will be described. This state can be established by turning on the linear solenoid SLU. When the linear solenoid SLU is turned on, the lock-up relay valve 60 is brought into the state indicated in the right half in FIG. 1, and the lock-up control valve 70 is brought into a state in which the spool 74 is moved to a position at which the forces and pressures discussed above are balanced against each other. Therefore, communication between the bypass oil passage 82 and the secondary pressure oil passage 84 is allowed, communication between the secondary pressure oil passage 84 and the engagement oil chamber oil passage 85 is allowed, communication between the secondary pressure oil passage 84 and the communication oil passage 87 is allowed, communication between the communication oil passage 87 and the disengagement oil chamber oil passage 86 is allowed, and communication between the discharge pressure oil passage 83 and the cooler oil passage 88 is allowed. This allows the line pressure PL output to the bypass oil passage 82 after bypassing the primary regulator valve 40 to be input to the engagement oil chamber 11a of the torque converter 11 sequentially via the secondary pressure oil passage 84 and the engagement oil chamber oil passage 85, and to be input to the disengagement oil chamber 11b of the torque converter 11 sequentially via the secondary pressure oil passage 84, the communication oil passage 87, and the disengagement oil chamber oil passage 86. Also in this case, the secondary regulator valve 50 regulates the hydraulic pressure in the secondary pressure oil passage 84 to the secondary pressure PS. Thus, a hydraulic pressure obtained by restricting the line pressure PL to the upper limit pressure PSmax of the secondary pressure PS is actually supplied to the torque converter 11. The communication oil passage 87 is filled with the oil when the linear solenoid SLU is turned off. Therefore, the oil can be smoothly supplied to the disengagement oil chamber oil passage 86 when the linear solenoid SLU is switched from off to on. Then, as the output pressure Pslu of the linear solenoid SLU is increased to become gradually higher from the state in which a hydraulic pressure is supplied to both the engagement oil chamber 11a and the disengagement oil chamber 11b, the signal pressure input to the signal pressure input port 72a of the lock-up control valve 70 is gradually increased to gradually reduce the area of opening of the input port 72d, which reduces the amount of oil flowing from the secondary pressure oil passage 84 to the communication oil passage 87. Therefore, the hydraulic pressure in the disengagement oil chamber 11b is gradually reduced. This allows the lock-up clutch 16 to be engaged by generating a pressure difference between the engagement oil chamber 11a and the disengagement oil chamber 11b. When the maximum output pressure Pslu is output from the linear solenoid SLU, the lock-up control valve 70 is brought into the state indicated in the right half in FIG. 1, which allows the oil in the communication oil passage 87 to be drained, and thus also allows the oil in the disengagement oil chamber 11b connected to the communication oil passage 87 via the disengagement oil chamber oil passage 86 to be drained. Therefore, the hydraulic pressure in the disengagement oil chamber 11b is made minimum, and the pressure difference between the engagement oil chamber 11a and the disengagement oil chamber 11b is made maximum, which completely engages the lock-up clutch 16. When the linear solenoid SLU is turned on, in addition, communication between the discharge pressure oil passage 83 and the cooler oil passage 88 is allowed, and thus the discharge pressure output to the discharge pressure oil passage 83 can be supplied to the cooler. Therefore, the oil can be immediately supplied to the cooler compared to a case where the discharge pressure from the secondary regulator valve 50 is supplied to the cooler.

Figure 2A:
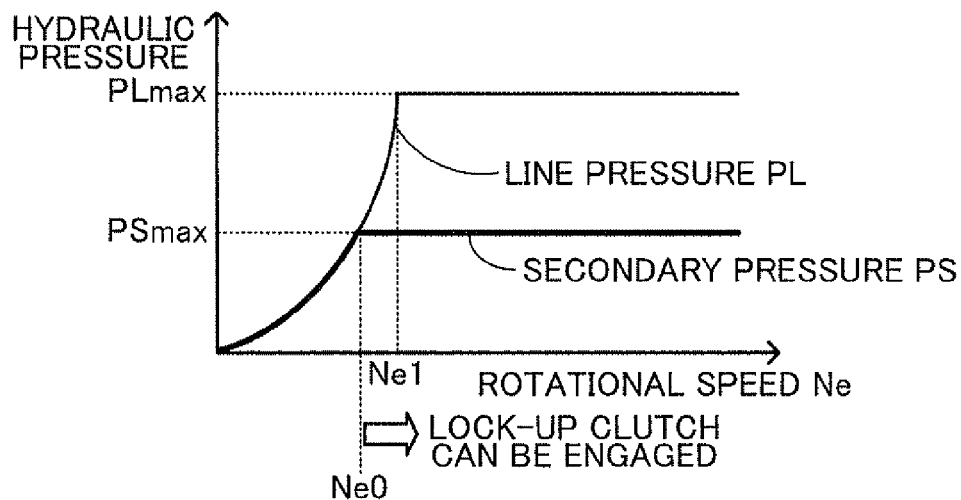
FIGS. 2A and 2B illustrate the relationship between a rotational speed Ne of an engine and hydraulic pressures.
Figure 2B:
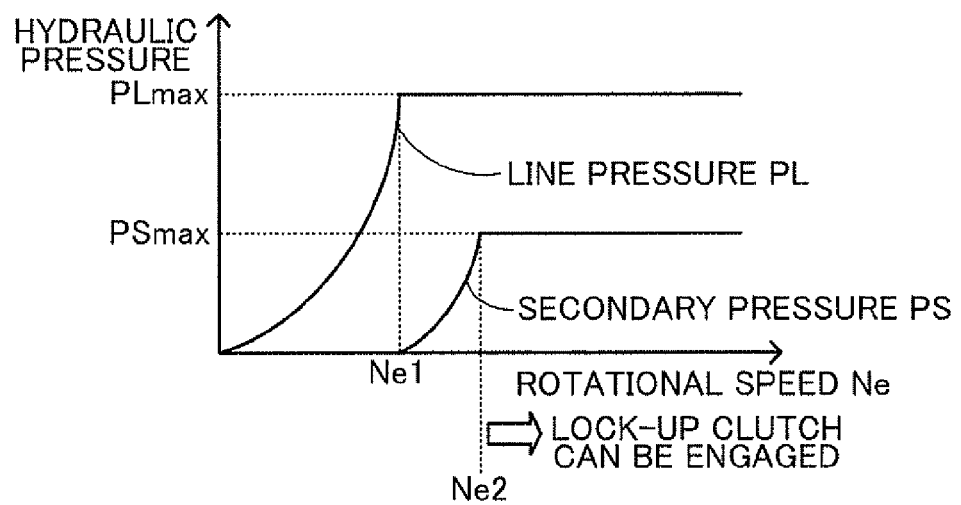

Here, engagement of the lock-up clutch 16 in the case where the rotational speed of the engine is low (at 900 rpm, 1000 rpm, or so, for example), for example immediately after start of the automobile incorporating the hydraulic pressure control device 20, is considered. FIGS. 2A and 2B illustrate the relationship between a rotational speed Ne of the engine and the hydraulic pressures, in which the relationship according to the embodiment is shown in FIG. 2A and the relationship according to a comparative example is shown in FIG. 2B. In the comparative example, the bypass oil passage 82 is not provided, and only the discharge pressure output from the primary regulator valve 40 to the discharge pressure oil passage 83 as the line pressure PL is regulated is regulated to the secondary pressure PS by the secondary regulator valve 50. As the rotational speed Ne of the engine is raised, the ejection pressure of the mechanical oil pump 31 becomes gradually higher. Therefore, in both FIGS. 2A and 2B, the line pressure PL is raised as the rotational speed Ne is raised, and reaches the upper limit pressure PLmax when the rotational speed Ne reaches a rotational speed Ne1. As discussed above, the primary regulator valve 40 does not output a discharge pressure while the line pressure PL is low, and outputs a discharge pressure after the line pressure PL exceeds the upper limit pressure PLmax. Therefore, in the comparative example, as shown in FIG. 2B, the secondary pressure PS is gradually raised after the rotational speed Ne reaches the rotational speed Ne1 at which a discharge pressure is output, and reaches the upper limit pressure PSmax when the rotational speed Ne reaches a rotational speed Ne2. Here, it is assumed that the upper limit pressure PSmax is required for the lock-up clutch 16 to be engaged, for example. Then, in the comparative example, the lock-up clutch 16 can be engaged after the rotational speed Ne reaches the rotational speed Ne2. In the embodiment, meanwhile, the line pressure PL from the bypass oil passage 82 is input to the secondary pressure oil passage 84. Thus, the oil is input to the bypass oil passage 82 before the line pressure PL reaches the upper limit pressure PLmax. Therefore, as shown in FIG. 2A, the hydraulic pressure in the secondary pressure oil passage 84 is varied as indicated by the thick line in the drawing, which enables the lock-up clutch 16 to be engaged when the rotational speed Ne is a rotational speed Ne0 which is lower than the rotational speed Ne1. That is, in the embodiment, the region in which the lock-up clutch 16 can be engaged can be expanded to a low-speed side (the side on which the rotational speed Ne is lower) to enable the lock-up clutch 16 to be engaged even from a state in which the ejection pressure of the mechanical oil pump 31 is low. In addition, the bypass oil passage 82 is branched from the line pressure oil passage 81 which carries a relatively large amount of oil. Therefore, it is possible to suppress the influence of variations in hydraulic pressure along with engagement of the lock-up clutch 16 on control for other friction engagement elements of the automatic transmission or the like. Further, the input port 62e of the switching valve 60 is connected to the bypass oil passage 82 via the orifice 82a. Thus, it is possible to more reliably suppress the influence of such variations in hydraulic pressure on control for other elements. When the lock-up clutch 16 is being disengaged, meanwhile, it is only necessary to supply a hydraulic pressure that can circulate in the torque converter 11. Thus, the discharge pressure from the primary regulator valve 40 is supplied to the secondary pressure oil passage 84. Based on these factors, the lock-up clutch 16 can be engaged more appropriately even from a state in which the rotational speed of the engine is low and the ejection pressure of the mechanical oil pump 31 is low.

The hydraulic pressure control device 20 according to the embodiment described above includes the bypass oil passage 82 branched from the line pressure oil passage 81 to bypass the primary regulator valve 40, and the switching portion 60a connected to the bypass oil passage 82, the discharge pressure oil passage 83 to which a discharge pressure from the primary regulator valve 40 is output, and the secondary pressure oil passage 84. When the lock-up clutch 16 is to be engaged, switching is made to connect the bypass oil passage 82 and the secondary pressure oil passage 84 to each other. When the lock-up clutch 16 is to be disengaged, switching is made to connect the discharge pressure oil passage 83 and the secondary pressure oil passage 84 to each other. Thus, the lock-up clutch 16 can be engaged, even from the time when the ejection pressure of the mechanical oil pump 31 is low, while suppressing the influence of variations in hydraulic pressure along with engagement of the lock-up clutch 16 on control for other elements. As a result, the lock-up clutch can be engaged more appropriately even from a state in which the rotational speed of the engine is low and the ejection pressure of the mechanical oil pump 31 is low. In addition, the switching portion 60a is incorporated in the lock-up relay valve 60 so that connection of the oil passages is switched using the common spool 64. Thus, supply of a hydraulic pressure can be controlled more smoothly, and the space requirements can be reduced. Further, the input port 62e of the switching valve 60 (switching portion 60a) is connected to the bypass oil passage 82 via the orifice 82a. Thus, it is possible to more reliably suppress the influence of variations in hydraulic pressure on control for other elements via the bypass oil passage 82 and the line pressure oil passage 81.

In the hydraulic pressure control device 20 according to the embodiment, the switching portion 60a is incorporated in the lock-up relay valve 60. However, the present invention is not limited thereto, and the switching portion 60a may be provided as an independent switching valve that is separate from the lock-up relay valve. In this case, the signal pressure Pslu from the linear solenoid SLU may be input to the independent switching valve, for example.

In the hydraulic pressure control device 20 according to the embodiment, the discharge pressure of the discharge pressure oil passage 83 can be supplied to the cooler oil passage 88. However, the present invention is not limited thereto, and the discharge pressure of the discharge pressure oil passage 83 may be supplied to an oil passage connected to another object such as the object to be lubricated (LUBE), for example.

In the hydraulic pressure control device 20 according to the embodiment, the input port 62e of the switching valve 60 is connected to the bypass oil passage 82 via the orifice 82a. However, the present invention is not limited thereto, and the input port 62e of the switching valve 60 may be connected to the bypass oil passage 82 not via an orifice.

In the hydraulic pressure control device 20 according to embodiment, supply of a hydraulic pressure to the torque converter 11 mounted on an automobile is controlled. However, the present invention is not limited thereto, and supply of a hydraulic pressure to the torque converter which includes the lock-up clutch may be controlled. Also, a hydraulic pressure for a torque converter mounted on a movable body such as a vehicle other than an automobile, a ship, and an airplane may be controlled. Alternatively, a hydraulic pressure for a torque converter mounted on a stationary device may be controlled.

Here, the correspondence between the main elements of the embodiment and the main elements of the invention described in the "SUMMARY OF THE INVENTION" section will be described. In the embodiment, the mechanical oil pump 31 corresponds to a "mechanical oil pump". The primary regulator valve 40 corresponds to a "first pressure regulation valve". The secondary regulator valve 50 corresponds to a "second pressure regulation valve". The bypass oil passage 82 corresponds to a "bypass oil passage". The switching portion 60a of the lock-up relay valve 60 which switches connection between the bypass oil passage 82 and the secondary pressure oil passage 84 and connection between the discharge pressure oil passage 83 and the secondary pressure oil passage 84 corresponds to a "first switching valve". A portion of the lock-up relay valve 60 other than the switching portion 60a corresponds to a "second switching valve". In addition, the entire lock-up relay valve 60 corresponds to a combination of the "first switching valve" and the "second switching valve". The lock-up control valve 70 corresponds to a "control valve". The orifice 82a corresponds to an "orifice". The correspondence between the main elements of the embodiment and the main elements of the invention described in the "SUMMARY OF THE INVENTION" section does not limit the elements of the invention described in the "SUMMARY OF THE INVENTION" section, because the embodiments are an example given for the purpose of specifically describing a mode for carrying out the invention described in the "SUMMARY OF THE INVENTION" section. That is, the invention described in the "SUMMARY OF THE INVENTION" section should be construed on the basis of the description in that section, and the embodiment is merely a specific example of the invention described in the "SUMMARY OF THE INVENTION" section.

While a mode for carrying out the present invention has been described above by way of an embodiment, it is a matter of course that the present invention is not limited to the embodiment in any way, and that the present invention may be implemented using various embodiments without departing from the scope and sprit of the present invention.

The present invention is applicable to the hydraulic pressure control device manufacturing industry.

What is claimed is:

1. A hydraulic pressure control device that controls supply of a hydraulic pressure to a torque converter including a lock-up clutch that is engageable using a hydraulic pressure from a mechanical pump driven by power from a motor, comprising:
   a first pressure regulation valve that regulates a hydraulic pressure in a first oil passage connected to the mechanical pump while discharging oil in the first oil passage to a discharge oil passage;
   a bypass oil passage branched from the first oil passage to bypass the first pressure regulation valve;
   a first switching valve that is selectively switchable between a first state in which the bypass oil passage and a second oil passage are connected to each other and a second state in which the discharge oil passage and the second oil passage are connected to each other; and
   a second pressure regulation valve that regulates a hydraulic pressure in the second oil passage, wherein
   the first switching valve is configured to be switched into the first state to engage the lock-up clutch, and to be switched into the second state to disengage the lock-up clutch.

2. The hydraulic pressure control device according to claim 1 which controls the hydraulic pressure to the torque converter which engages the lock-up clutch using an engagement pressure corresponding to a difference in oil pressure between an engagement oil chamber and a disengagement oil chamber, further comprising
   a second switching valve that is selectively switchable between a first state in which the hydraulic pressure in the second oil passage is input to both the engagement oil chamber and the disengagement oil chamber and a second state in which the hydraulic pressure in the second oil passage is input to the disengagement oil chamber to be output from the engagement oil chamber, wherein
   the first switching valve and the second switching valve are configured to be switchable using a common spool such that the first state of the first switching valve and the first state of the second switching valve correspond to each other and the second state of the first switching valve and the second state of the second switching valve correspond to each other.

3. The hydraulic pressure control device according to claim 1, wherein
   the first switching valve is connected to the bypass oil passage via an orifice.

4. The hydraulic pressure control device according to claim 1, wherein
   the first switching valve is further connected to a cooler oil passage coupled to a cooler that cools oil, and connects the discharge oil passage and the cooler oil passage in the first state.

5. The hydraulic pressure control device according to claim 1, further comprising
a control valve that can discharge at least part of the oil input to the disengagement oil chamber.

* * * * *